United States Patent
Ballew

(10) Patent No.: US 7,416,672 B2
(45) Date of Patent: Aug. 26, 2008

(54) METHODS AND APPARATUS FOR SEPTIC TANK SYSTEM CHLORINATION

(76) Inventor: Thomas Ballew, 1701 Country Club Rd., Bowie, TX (US) 76230

(*) Notice: Subject to any disclaimer, the term of this patent is extended or adjusted under 35 U.S.C. 154(b) by 249 days.

(21) Appl. No.: 11/348,135

(22) Filed: Feb. 6, 2006

(65) Prior Publication Data

US 2006/0175264 A1    Aug. 10, 2006

Related U.S. Application Data

(60) Provisional application No. 60/650,882, filed on Feb. 7, 2005.

(51) Int. Cl.
- C02F 1/72 (2006.01)
- C02F 1/68 (2006.01)
- B01D 15/00 (2006.01)
- A61L 2/18 (2006.01)
- B05B 17/04 (2006.01)
- A24F 25/00 (2006.01)

(52) U.S. Cl. .............. 210/756; 210/758; 210/749; 210/198.1; 210/170.08; 422/37; 239/11; 239/37

(58) Field of Classification Search ............ 210/754, 210/753, 756, 170.08, 205, 209, 532.2, 198.1, 210/631; 422/37; 239/37, 38
See application file for complete search history.

(56) References Cited

U.S. PATENT DOCUMENTS

| | | | | |
|---|---|---|---|---|
| 2,907,463 A | * | 10/1959 | Light et al. | ............. 210/202 |
| 4,882,046 A | | 11/1989 | Waite | |
| 5,084,920 A | | 2/1992 | Kimball | |
| 5,160,606 A | * | 11/1992 | De Simone et al. | ......... 210/110 |
| 5,536,404 A | | 7/1996 | Drewery | |
| 5,667,670 A | | 9/1997 | Drewery | |
| 6,183,631 B1 | | 2/2001 | Cormier et al. | |
| 6,210,566 B1 | | 4/2001 | King | |
| 6,281,802 B1 | | 8/2001 | Venable et al. | |
| 6,309,551 B1 | | 10/2001 | Suchecki, Jr. et al. | |
| 6,949,187 B2 | | 9/2005 | Smith | |

* cited by examiner

Primary Examiner—Mikhail Kornakov
Assistant Examiner—Lucas Stelling
(74) Attorney, Agent, or Firm—Morriss O'Bryant Compagni

(57) ABSTRACT

Methods and apparatus for the slow, generally uniform addition of a disinfectant solution comprising an active ingredient, such as chlorine, to achieve a substantially constant level of active ingredient in the liquid of a grey water reservoir of a residential septic tank system prior to dispersal. A container configured to reside in a standard chlorine tablet dispenser is filled with a disinfectant solution, which contains a disinfecting substance as an active ingredient. A drip-valve is used to regulate the drip flow of the disinfecting solution out of the container and into the grey water reservoir.

17 Claims, 5 Drawing Sheets

US 7,416,672 B2

METHODS AND APPARATUS FOR SEPTIC TANK SYSTEM CHLORINATION

CROSS-REFERENCE TO RELATED APPLICATION

This application claims the benefit of U.S. Provisional Application No. 60/650,882, filed Feb. 7, 2005, which is incorporated herein by reference in its entirety.

TECHNICAL FIELD

The present invention relates to systems, apparatus, and methods for providing a disinfectant solution to the grey water of an aerobic septic system.

BACKGROUND

In aerobic septic systems, following digestion of the waste, a grey water reservoir is used to store the grey water. State and federal regulations typically require that a minimum level of disinfectant, for instance chlorine, be present in the grey water contained in the grey water reservoir prior to discharge. For example, in Texas, a level of 1 ppm chlorine is to be maintained. Typically, solid chlorine pellets that dissolve to release chlorine are used to disinfect grey water. The incoming grey water is passed over a chlorine pellet to sufficiently chlorinate the incoming water. However, these chlorine pellets can be expensive. Such pellets can cost up to three times as much as an equivalent amount of chlorine that is commercially available in the form of household chlorine bleach.

Previous devices for adding household chlorine bleach to a grey water reservoir either added the chlorine all at once prior to dispersal or in a drip-wise fashion. Those systems that add the chlorine all at once allow the grey water to remain untreated for a long period. This can be problematic if the grey water reservoir is ever pierced, allowing the untreated grey water to seep into the ground. Furthermore, an extended period without treatment may allow the grey water to ferment, causing noxious odors.

One previously known system for use with a standard residential septic system consisted of a cap, with a pre-cut hole, screwed to the top of a commercially available household bleach bottle. The bleach bottle was then inverted over a gray water reservoir tank, inside the pumping access hatch, to let the bleach drip out over time. Such devices have numerous limitations including limited capacity, limited options for placement, difficulty in accessing the grey water reservoir to suspend the device, difficulty in refilling the device, and the lack of an ability to reversibly adjust the drip rate. However, some septic tank systems make disinfectant available to grey water by flowing grey water through a pipe in which is maintained a chlorine tablet by a chlorine tablet feeding mechanism, which pipe then drains into the grey water reservoir tank. Some such systems may not be suitable for disinfection using the prior art device, or it may be cumbersome to do so.

Thus, systems and methods that provide alternate, easier to use, and less expensive ways of adding disinfectant to the grey water of an aerobic septic system would be an improvement in the art.

SUMMARY

The present invention provides systems and methods for the slow, uniform addition of a disinfectant solution comprising an active ingredient, such as chlorine, by means of a drip device to achieve a substantially constant level of active disinfectant ingredient flow into grey water of an aerobic septic system prior to dispersal. This may be accomplished through the use of an appropriately configured container space for containing a volume of a disinfectant solution and a valve for regulating the drip-wise flow of the disinfectant solution out of the container space and into the grey water.

Thus, apparatus for disinfecting the grey water of an aerobic septic system are disclosed. These apparatus include a container space for holding a volume of disinfectant solution that is configured for insertion into a chlorine tablet dispensing system and a valve, which may be an adjustable valve, for regulating the drip-wise addition of disinfectant solution to the grey water of an aerobic septic system.

The present invention also includes methods for disinfecting the grey water of an aerobic septic system. Using the teachings of the present invention, the grey water of an aerobic septic system may be disinfected by the addition of a disinfectant solution through a valve in a drip-wise manner to the grey water in a tank of a conventional septic system.

DESCRIPTION OF THE DRAWINGS

It will be appreciated by those of ordinary skill in the art that the elements depicted in the various drawings are for exemplary purposes only. The nature of the present invention, including the best mode, as well as other embodiments of the present invention, may be more clearly understood by reference to the following detailed description of the invention, to the appended claims, and to the several drawings.

DETAILED DESCRIPTION

The present invention relates to systems and methods related to drip system for supplying disinfectant solution to the grey water in an aerobic septic system. It will be appreciated by those skilled in the art that the embodiments herein described, while illustrating certain embodiments, are not intended to so limit the invention or the scope of the appended claims. Those skilled in the art will also understand that various combinations or modifications of the embodiments presented herein can be made without departing from the scope of the invention. All such alternate embodiments are within the scope of the present invention. Similarly, while the drawings depict illustrative embodiments of devices and components in accordance with the present invention and illustrate the principles upon which the depicted device or component is based, they are only illustrative and any modification of the invented features presented herein are to be considered within the scope of this invention.

In one illustrative embodiment, suitable disinfectant solutions for grey water contained in a storage reservoir or "grey water tank" of an aerobic septic system are oxidizing solutions. One such suitable oxidizing solution may be a solution of from about 5% to about 6% sodium hypochlorite solution, such as that commonly available as household chlorine bleach (suitable household chlorine bleaches include those sold under the trademark CLOROX™ and competing brands). It will be appreciated that other concentrations of sodium hypochlorite solutions may be used, where desirable. Further, other oxidizing agents including, but not limited to, calcium hypochlorite, potassium hypochlorite, bromine, hydrogen peroxide, and others, may be used in aqueous solution of suitable strength. It will be of course appreciated by one of skill in the art any disinfectant suitable for use in a disinfectant solution to be added to a grey water tank may be used within the scope of the present invention.

Figure 1:
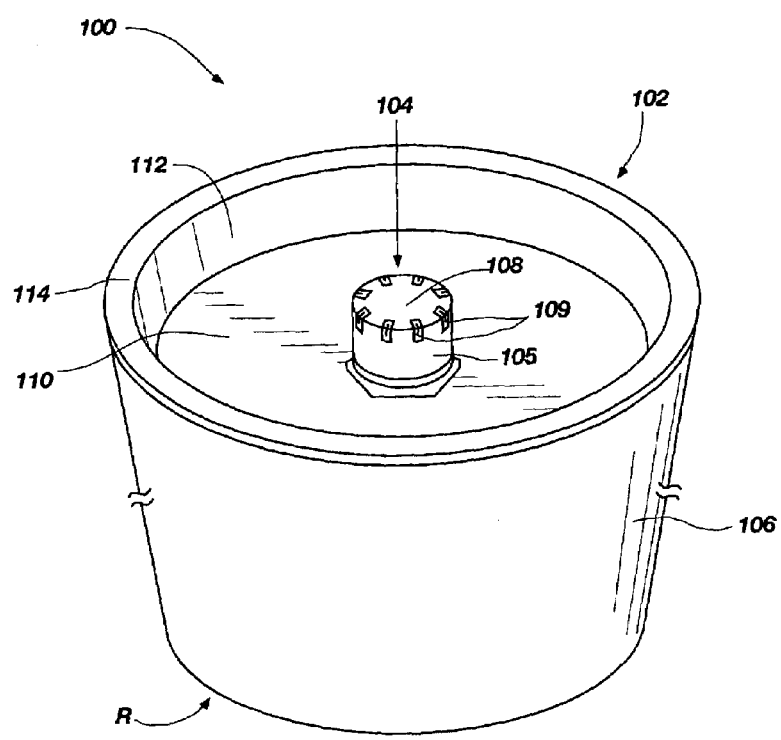
FIG. 1 is an exterior perspective view showing a portion of one illustrative embodiment of an assembled apparatus for grey water reservoir chlorination.
Figure 2:
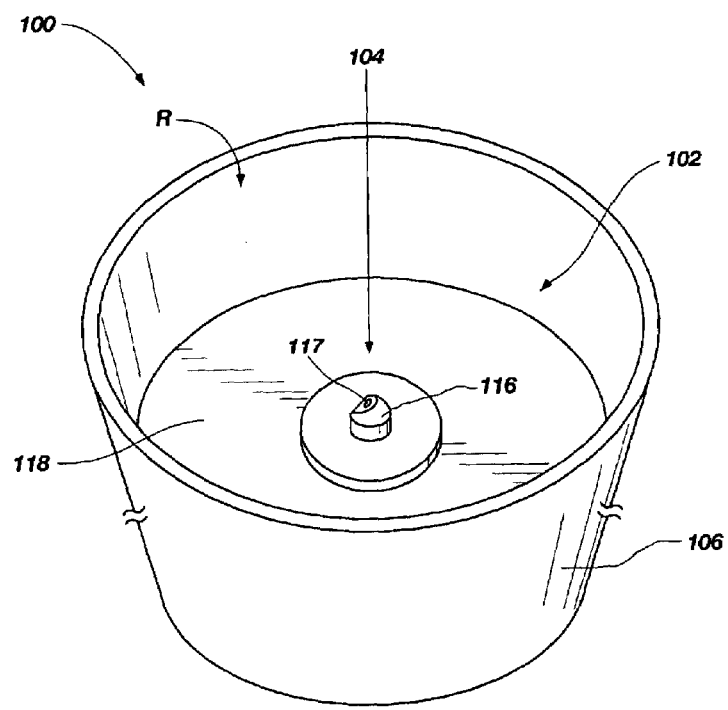
FIG. 2 is an interior perspective view of the embodiment of FIG. 1.
Figure 3:
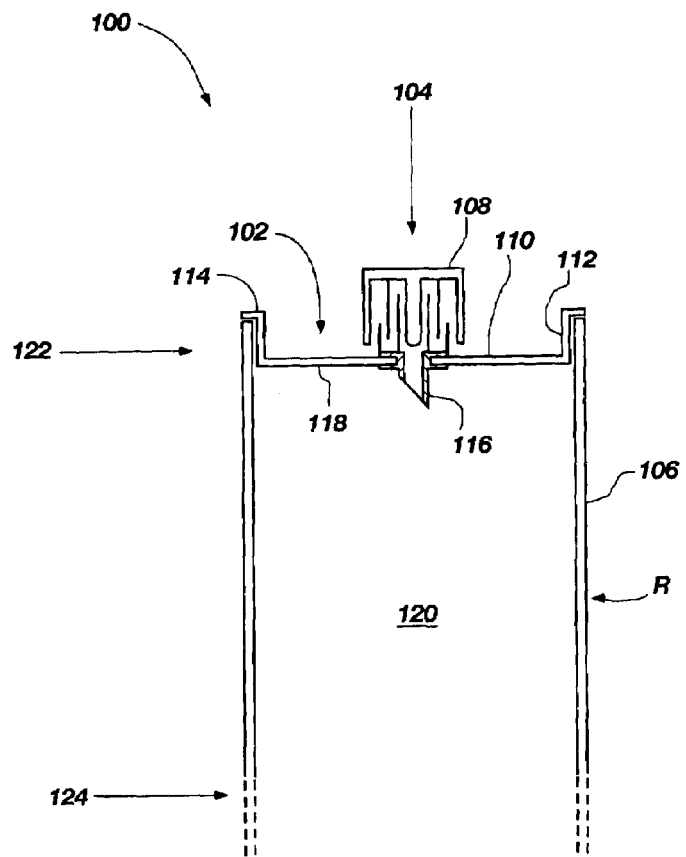
FIG. 3 is a cross-sectional view of a portion the embodiment of FIGS. 1 and 2.

Depicted in FIGS. 1, 2 and 3 is one illustrative embodiment of an apparatus in accordance with the present invention. As depicted, an apparatus for grey water reservoir chlorination generally indicated at 100, includes a reservoir R for holding disinfectant solution which is configured by size and shape to fit inside the chlorine tablet dispenser of a standard septic tank system. Most chlorine tablet dispensers consist of an elongated tube extending from a hatch located at or above the ground surface to either a grey water reservoir or to a tube through which grey water flows into a holding tank. A chlorine tablet feeding mechanism is located inside the elongated tube. Accordingly, the reservoir R may be a tube 106, which is depicted as a tube having a round cross-section. It will be appreciated that a tube having any cross-sectional shape may be used, as is desirable for the installation required. For example, tube 106 may have a square, rectangular, triangular, elliptical or other cross section, provided the tube 106 can fit within the chlorine tablet dispenser tube.

Tube 106 has a distal end wall, which may be an end cap, as indicated generally at 102. In the distal end wall is disposed a drip valve generally indicated at 104. Drip valve 104 is configured so as to have an end for liquid exit 108 and an end for liquid entry 116 (FIG. 2). Distal end wall or end cap 102 includes an exterior face 110 and an interior face 118 (FIG. 2). End cap 102 may further include a fastening structure, such as annular edge 112 and annular lip 114, for operatively fastening cap 102 to tube 106. It will be appreciated that any suitable system known to those of ordinary skill in the art for attaching a cap to a container in a watertight manner may be used. Such systems include, but are not limited to, interlocking threads, friction fittings, rubber or synthetic O-rings, and various sealants such as, but not limited to, glues or epoxies. It will be further appreciated by one of skill in the art that although the illustrative embodiment depicts an injection molded plastic "male" cap, the present invention may be adapted to use a "female" cap or any other device or means for closing one end of a tube and can be made of any suitable material, including, buy not limited to, rubber, plastic, metal, or wood.

FIG. 1 further shows drip valve 104 operatively disposed through the body of the distal end wall, represented as end cap 102. As illustrated, drip valve 104 is disposed through the end cap 102 such that the end for liquid exit 108 is on the same side of cap 102 as exterior face 110 the and the end for liquid entry 116 (FIG. 2) is on the same side of cap 102 as interior face 118 (FIG. 2). Drip valve 104 may be configured in a single fixed configuration, such that the drip-rate of disinfectant solution passing through drip valve 104 is fixed by the fixed size of the opening(s) therein. Alternatively, the drip-rate may be selectively adjustable. In such embodiments, the drip valve 104 may have different drip settings that can be selected for different flow-rates. For example, the rotation of the outer cap 105 of drip valve 104 may adjust the volume of the passages therethrough or of the liquid exit opening 109. The drip-rate may thus be controlled by selecting a drip setting through rotating the end for liquid exit 108. Different settings may thus control the drip rate by altering the passage size through which the disinfectant solution passes. Suitable valves may include drip line sprinkler heads designed for a drip irrigation system, which are adapted for use. One such suitable valve is the SHRUBBLER™, available from ANTELCO PTY LTD CORPORATION, which may be adapted for use by being glued in an opening made in the end cap 102.

Typically, the drip setting is selected to allow for a desired drip rate, such that a suitable amount of active ingredient in a disinfectant solution may be delivered at a desired rate. A preferable drip rate for an active ingredient is such that the level of coliform bacteria is maintained below the levels required by law or such that the amount of active ingredient in the grey water reservoir is maintained above the levels required to sufficiently disinfect the grey water reservoir or required by statute, for example Title 30 Texas Administrative Code § 317 or other pertinent state or local requirements. In addition, the rate of addition for an active ingredient is preferably kept below the maximum concentration of disinfectant allowed by statute or below a concentration that may damage the septic tank system or the drain field site (often under a residential lawn). For example, a desired (or required minimum) level of chlorine in the grey water tank may be 0.5 mg/L. In use, the valve 104 may be adjusted as necessary to ensure appropriate flow of a chlorine solution into the septic system to maintain the grey water tank above this level.

It will be appreciated by one of skill in the art that the drip rate may be controlled by valves 104 other than a drip valve. Suitable valves may include, but are not limited to, ball valves, butterfly valves, globe valves, rotary valves, stopcocks or any other device for limiting the flow of liquid which allows controlled variation in the size of the opening through which the liquid may flow. Alternatively, the drip-rate may be regulated by using a mechanical pump, such as a variable drip pump, peristaltic pump or diastaltic pump, which may be used to pump disinfectant solution in a drop-wise manner from the reservoir 102 into the grey water reservoir at a rate similar to that determined by the other methods.

FIG. 2 depicts an interior view of the apparatus 100 of FIG. 1. Visible in this view are the end for liquid entry 116 of drip valve 104 and the interior face 118 of cap generally 102.

As best seen in FIG. 3, an end cap 102 may be attached to tube 106 to form the distal end wall of a container space 120. When end cap 102 is joined to a tube 106, cap 102 is typically disposed such that interior face 118 and end for liquid entry 116 are disposed toward the container space 120 and exterior face 110 and end for liquid exit 108 are disposed toward the exterior environment. Container space 120 has a closed distal end generally 122 and a proximal end generally 124. As will be appreciated by one of skill in the art, proximal end 124 may include a removable cap, if desired or needed by the user. Such a removable cap may or may not be airtight. It will be appreciated that the fastening of cap 102 to tube 106 represents but one method of constructing a container space 120. Any other structure or container that can be joined with a cap such as cap 102 to form a container may be used.

As represented in FIG. 3, tube 106 in some embodiments may be exemplified by a length of commercially available pipe. Such pipe may be formed from PVC, ABS or other suitable plastic, suitable metal, or any other suitable material. The pipe must be of sufficiently narrow diameter to fit within the chlorine tablet feeder tube of a septic tank system. For example, a 2½ inch of 3 inch PVC pipe may be used. The pipe may be of any suitable length, although it is currently preferred to be of sufficient length to extend to the top of the feeder tube. For some emplacements, an extended pipe may be inserted into the feeder tube and the appropriate length marked, following which the pipe is trimmed to proper length.

It will be further appreciated that, although container space 120 of the depicted embodiment is constructed from cap 102 and tube 106, the methods and systems of the present invention may be practiced using any container space which is capable of holding a disinfectant solution and has a boundary walls through which a drip valve 104 may be operatively disposed.

Figure 4:
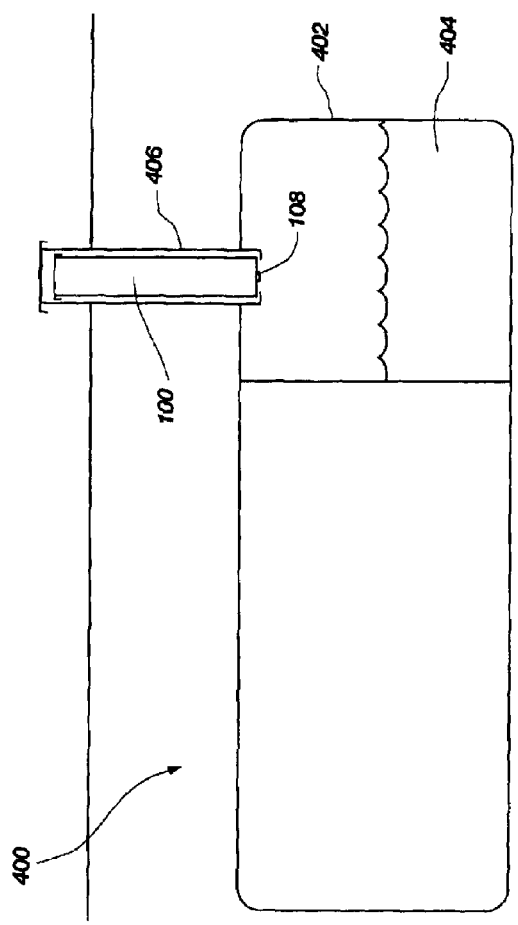
FIG. 4 is a sectional view of one embodiment of an aerobic septic system including an assembled apparatus for grey water reservoir chlorination as it may be used in adding a disinfectant solution to a grey water reservoir.

As shown in FIG. 4, the assembled apparatus 100 may be suspended in communication with the grey water reservoir 402 of an aerobic septic system generally 400, such that disinfectant solution may be provided in a drip-wise manner thereto. For example, apparatus 100 may be inserted into the 4" diameter feed tube 406 designed to provide chlorine pellets (such as in U.S. Pat. No. 6,294,086 B1) such that the end for liquid exit 108 of drip valve 104 faces the grey water 404. It will be appreciated that any other holder for apparatus 100, such as a specially constructed holster or a rope may be used.

It will be appreciated that drip valve 104 disposed through the body of any boundary wall of container space 120 may be any number of drip valves such that a desired drip-rate may be maintained. Multiple drip valves will allow for a single container space 120 to serve a larger reservoir 402 where the increased drip rate is beyond the ability of a single drip valve to supply. Of course, multiple systems 100 may be used to treat a larger reservoir 402 as well.

In one illustrative method according to the invention, a drip chlorinator apparatus 100 is inverted over the grey water 404 in the grey water reservoir 402 such that the proximal end 124 of the apparatus 100 remains above the distal end 122. Commercially available household chlorine bleach may then be added to the proximal end 124 of the apparatus 100. The drip valve 104 may be then adjusted to control the drip rate of the household chlorine bleach, through the adjustable drip valve 104, and into the grey water 404 in the grey water reservoir 402 of an aerobic septic system 400. The disinfecting solution drip-rate may then be regulated to effectuate a controlled rate of addition for the active ingredient into the grey water reservoir 402.

Figure 5:
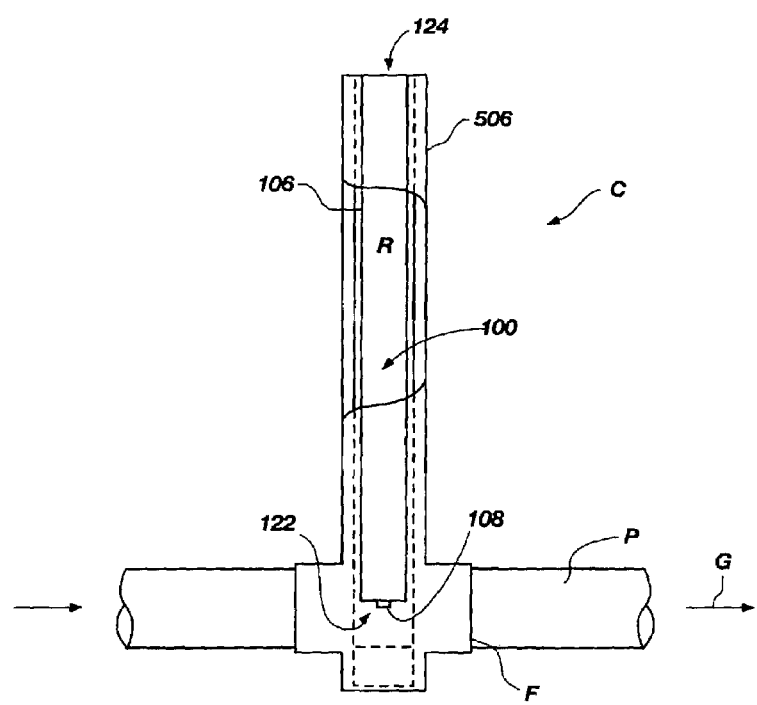
FIG. 5 is a sectional view of one embodiment of a standard septic system tablet chlorinator that is adapted for use with the apparatus of FIGS. 1 to 3.

As depicted in FIG. 5, an apparatus 100 in accordance with the present invention may be used in a chlorine tablet feeder C of an aerobic septic tank system. One such standard chlorine tablet feeder is that described in U.S. Pat. No. 6,281,802, the disclosure of which is incorporated by reference herein in its entirety.

For such use, the tablet feeding mechanism or low tablet alarm system is removed from the chlorinator feed tube 506 and the apparatus 100 inserted therein. This insertion may include marking and cutting the pipe to a suitable length to form container space 120. The distal end 122 resides at the lower end of the chlorinator feed tube, near fitting F. A suitable holster, sling or stop may be placed in the chlorine tablet feeder C to maintain the apparatus 100 in proper position. Disinfectant solution is then added to the apparatus 100 reservoir R through proximal end 124 and flows in a drip-wise fashion through drip valve 104. The disinfectant solution thus mixes with grey water flowing through pipe P as indicated by arrows G. The apparatus may be refilled with disinfectant solution as needed, and may be withdrawn should adjustment of the drip-valve 104 be desired.

In another illustrative method according to the invention, the chlorine tablet feeder is removed from the septic system and a drip chlorinator apparatus 100 is placed into the feeder C such that the proximal end 124 of the apparatus 100 remains above the distal end 122. Commercially available household chlorine bleach may then be added to the proximal end 124 of the apparatus 100. The drip valve 104 may be then adjusted to control the drip rate of the household chlorine bleach, through the adjustable drip valve 104 and into the grey water 404 in the grey water reservoir 402 of an aerobic septic system 400. The level of chlorine in the grey water may be determined by any standard chlorine level analysis. The disinfecting solution drip-rate may then be regulated to effectuate a controlled rate of addition for the active ingredient into the grey water reservoir 402

A preferred drip rate of disinfectant solution for any solution container or any size reservoir 402 can easily be determined by comparing the drip-rate of an experimental drip setting with the drip-rate of approximately 1.08 drops/minute required by an embodiment using 5-6% sodium hypochlorite solution to treat a 200-300 gallon reservoir 402. For example, a test drip setting may be selected and allowed to operate for 24 hours. The disinfectant concentration in the grey water reservoir can then be measured and compared to a desired concentration. The drip valve 104 may then be adjusted to increase the drip rate of the disinfectant solution if the disinfectant concentration in the grey water reservoir is below the desired level or may be adjusted to decrease the drip rate of the disinfectant solution if the disinfectant concentration in the grey water reservoir is higher than the desired level. It will be appreciated by one of skill in the art that, instead of adjusting drip valve 104, the concentration of the disinfectant in the disinfectant solution may be adjusted as required. This process can be repeated as often as necessary so as to select a drip rate which provides a desired concentration of disinfectant in the grey water reservoir. It will be appreciated by one of skill in the art that the drip rate may change as the head pressure provided by the remaining disinfectant in the container space is diminished. To overcome the decrease in head pressure, one may refill the container space as needed to maintain a suitable drip rate or a drip rate may be selected for the average head pressure and so maintain an average suitable drip rate over time.

While this invention has been described in certain illustrative embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for adapting a septic tank system configured for chlorine tablet disinfection to use a disinfect solution, the method comprising:
    inserting a disinfecting solution dispensing apparatus comprising a reservoir and at least one drip valve into the chlorine tablet feeder of the septic tank system;
    filling the reservoir with disinfecting solution, such that the disinfecting solution flows drip-wise over time through the drip valve into grey water contained in the septic tank system.

2. The method of claim 1, wherein filling the reservoir with disinfecting solution comprises filling the reservoir with a sodium hypochlorite solution.

3. The method of claim 1, wherein inserting a disinfecting solution dispensing apparatus comprising a reservoir and a drip valve into the chlorine tablet feeder of the septic tank system comprises inserting a disinfecting solution dispensing apparatus wherein the reservoir is formed from a section of pipe having a capped distal end.

4. The method of claim 3, wherein the reservoir is formed from a section of pipe having a capped distal end comprises inserting a disinfecting solution dispensing apparatus wherein the drip valve is disposed in the capped distal end.

5. The method of claim 1, wherein inserting a disinfecting solution dispensing apparatus comprising a reservoir and at least one drip valve into the chlorine tablet feeder of the septic tank system comprises inserting a disinfecting solution dispensing apparatus wherein the at least one drip valve comprises a drip valve having a selectively adjustable flow rate.

6. The method of claim 5, further comprising monitoring a level of disinfectant concentration in a grey water holding tank of the septic tank system and adjusting the selected flow rate of the at least one drip valve in response to the level of disinfectant.

7. The method of claim 1, wherein inserting a disinfecting solution dispensing apparatus comprising a reservoir and at least one drip valve into the chlorine tablet feeder of the septic tank system comprises inserting the disinfecting solution dispensing apparatus into a chlorine tablet feeder comprising a port into a grey water holding tank of the septic system.

8. The method of claim 1, wherein inserting a disinfecting solution dispensing apparatus comprising a reservoir and at least one drip valve into the chlorine tablet feeder of the septic tank system comprises inserting the disinfecting solution dispensing apparatus into a chlorine tablet feeder comprising a port into a pipe through which grey water flows into a holding tank of the septic system.

9. The method of claim 1, further comprising removing a chlorine tablet feeding mechanism from the chlorine tablet feeder prior to inserting the disinfecting solution dispensing apparatus therein.

10. A method of disinfecting grey water in a residential septic tank system, the method comprising:
    placing a disinfecting solution dispensing apparatus comprising a container space and at least one adjustable valve in a position such that disinfecting solution exiting the at least one adjustable valve flows into grey water held in the septic tank system comprising placing the disinfecting solution dispensing apparatus inside a port comprising a chlorine tablet feeder disposed over a grey water holding tank of the septic system; and
    filling the disinfecting solution dispensing apparatus with disinfecting solution, such that the disinfecting solution flows through the at least one adjustable valve into grey water contained in the septic tank system.

11. A method of disinfecting grey water in a residential septic tank system, the method comprising:
    placing a disinfecting solution dispensing apparatus comprising a container space and at least one adjustable valve in a position such that disinfecting solution exiting the at least one adjustable valve flows into grey water held in the septic tank system comprising inserting the disinfecting solution dispensing apparatus into a chlorine tablet feeder comprising a port into a pipe through which grey water flows into a holding tank of the septic system; and
    filling the container space with disinfecting solution, such that the disinfecting solution flows through the at least one adjustable valve into grey water contained in the septic tank system.

12. The method of claim 11, wherein filling the container space with disinfecting solution comprises filling the container space reservoir with an aqueous solution comprising an oxidizing agent selected from the group consisting of calcium hypochlorite, sodium hypochlorite, potassium hypochlorite, bromine, and hydrogen peroxide.

13. The method of claim 11, further comprising removing a chlorine tablet feeding mechanism from the chlorine tablet feeder prior to inserting the disinfecting solution dispensing apparatus therein.

14. The method of claim 11, wherein placing a disinfecting solution dispensing apparatus comprising a container space and at least one adjustable valve in a position such that disinfecting solution exiting the at least one adjustable valve flows into grey water held in the septic tank system comprises placing a disinfecting solution dispensing apparatus comprising a container space formed from a section of pipe having a capped distal end.

15. The method of claim 11, wherein placing a disinfecting solution dispensing apparatus comprising a container space and at least one adjustable valve in a position such that disinfecting solution exiting the at least one adjustable valve flows into grey water held in the septic tank system comprises placing a disinfecting solution dispensing apparatus wherein the at least one adjustable valve comprises a drip valve having a selectively adjustable flow rate.

16. The method of claim 11, wherein placing a disinfecting solution dispensing apparatus comprising a container space and at least one adjustable valve in a position such that disinfecting solution exiting the at least one adjustable valve flows into grey water held in the septic tank system comprises placing a disinfecting solution dispensing apparatus wherein the at least one adjustable valve is selected from the group consisting of ball valves, butterfly valves, globe valves, rotary valves, and stopcocks.

17. The method of claim 11, further comprising monitoring a level of disinfectant concentration in a grey water holding tank of the septic tank system and adjusting the selected flow rate of the at least one adjustable valve in response to the level of disinfectant.

* * * * *